United States Patent

Yasuda et al.

[11] Patent Number: 5,866,243
[45] Date of Patent: Feb. 2, 1999

[54] COMPOSITE SUBSTRATE FOR WATERPROOFING STRUCTURE, AND WATERPROOFING METHOD AND WATERPROOFING STRUCTURE USING SUCH COMPOSITE SUBSTRATE

[75] Inventors: Yoshinobu Yasuda, Kobe; Shuya Tsuji, Hannan; Haruyasu Ito; Sadao Araki, both of Tokyo, all of Japan

[73] Assignees: Sowa Chemical Co., Ltd., Kobe; Asahi Fiber Glass Company, Limited, Tokyo, both of Japan

[21] Appl. No.: 882,390

[22] Filed: Jul. 10, 1997

[30] Foreign Application Priority Data

Jul. 11, 1996 [JP] Japan ................................ 8-203095

[51] Int. Cl.$^6$ ........................... B32B 5/06; B32B 5/18; B32B 5/20; B32B 7/00
[52] U.S. Cl. ........................... 428/235; 156/71; 156/148; 156/278; 156/304.1; 156/304.3; 428/71; 428/245; 428/261
[58] Field of Search ................................ 427/246, 412.1, 427/393.4, 393.5, 412.4, 407.3; 428/70.71, 74, 235, 245, 261, 227, 228; 156/71, 148, 304.1, 304.3, 304.5, 305, 278

[56] References Cited

U.S. PATENT DOCUMENTS

| | | | |
|---|---|---|---|
| 3,658,612 | 4/1972 | Corzine | 156/93 |
| 3,661,674 | 5/1972 | Higgs et al. | 427/430.1 |
| 3,764,454 | 10/1973 | Healy et al. | 161/159 |
| 3,793,414 | 2/1974 | Buff et al. | 264/48 |
| 3,824,142 | 7/1974 | Healy et al. | 156/148 |
| 3,975,562 | 8/1976 | Madebach et al. | 428/95 |
| 4,006,052 | 2/1977 | Wang | 427/246 |
| 4,151,800 | 5/1979 | Dotts et al. | 427/397.7 |
| 4,393,634 | 7/1983 | McDermott et al. | 52/309.1 |
| 4,464,850 | 8/1984 | Ebert et al. | 36/44 |
| 4,465,730 | 8/1984 | Okada | 428/246 |
| 4,891,957 | 1/1990 | Strack et al. | 66/192 |
| 4,942,712 | 7/1990 | Thompson | 52/506 |
| 5,041,318 | 8/1991 | Hulls | 428/110 |
| 5,047,276 | 9/1991 | Chomarat et al. | 428/110 |
| 5,098,770 | 3/1992 | Paire | 428/198 |
| 5,130,187 | 7/1992 | Eberhardt | 428/95 |
| 5,565,259 | 10/1996 | Juriga | 428/137 |

FOREIGN PATENT DOCUMENTS

| | | |
|---|---|---|
| 0 355 277 | 2/1990 | European Pat. Off. . |
| 2 581 158 | 10/1986 | France . |
| 31 45 547 | 5/1983 | Germany . |
| 36 26 250 | 2/1988 | Germany . |
| 113 481 | 6/1975 | Switzerland . |

*Primary Examiner*—Diana Dudash
*Attorney, Agent, or Firm*—Oblon, Spivak, McClelland, Maier & Neustadt, P.C.

[57] ABSTRACT

A composite substrate for a waterproofing structure, which comprises a fiber mat and a closed cell foam sheet which are integrated by needling.

20 Claims, 1 Drawing Sheet

COMPOSITE SUBSTRATE FOR WATERPROOFING STRUCTURE, AND WATERPROOFING METHOD AND WATERPROOFING STRUCTURE USING SUCH COMPOSITE SUBSTRATE

The present invention relates to a composite substrate for a waterproofing structure, and a waterproofing method and a waterproofing structure using such a composite substrate. More particularly, it relates to a composite substrate for a waterproofing structure suitable for use in rooftop waterproofing or veranda waterproofing by means of a fiber-reinforced plastic (FRP), and a waterproofing method and a waterproofing structure using such a composite substrate.

A structure to which a waterproofing method is to be applied is made of concrete in many cases, and to provide a waterproofing function to such a structure by a fiber-reinforced plastic (FRP) layer, it is common to provide between such a structure and the FRP layer an alkali-proof sheet which has a follow-up property against expansion of the structure due to heat or against cracking of concrete due to drying and which protects the FRP layer from alkaline components from concrete.

Further, to impart a heat-insulating effect to such a waterproofing structure, a heat insulation material is used in combination. To obtain a higher heat-insulating effect, a foam sheet is used as a heat insulation material. As such a foam sheet, the one made of polyethylene or polyvinyl chloride is used taking the economical efficiency and the solvent resistance for laying-up FRP into consideration.

In a case where it is not required to take the influence of alkaline components over the FRP layer into consideration as in a case where the structure to which a waterproofing method is to be applied is made of wood, the material for the above sheet may be selected taking only the solvent resistance for formation of the FRP layer into consideration.

The above-mentioned waterproofing method has been carried out usually in such a manner that firstly a sheet made of e.g. a foamed plastic and a structure are bonded by a spot bonding method or by an entire surface bonding method by means of a chemical adhesive, then a fiber mat is laid on this sheet and then a resin is applied to form an FRP layer, or a preliminarily prepared FRP sheet is bonded thereto by means of an adhesive.

However, the following difficulties have been pointed out with respect to such a conventional waterproofing method.

(1) Bonding of the sheet to the structure and formation of the FRP layer or bonding of the FRP sheet are carried out independently, whereby the operation used to be cumbersome.

(2) Bonding of the sheet to the structure has been dependent solely on a chemical bonding force, whereby by an external force such as earthquake or expansion or shrinkage of the structure over a long period of time, interlaminar peeling is likely to take place, and once peeling occurs, moisture contained in the structure at such a portion will evaporate, and expansion or shrinkage of the volume will be repeated, whereby a so-called "blister" will form and spread.

(3) Bonding of the FRP layer (inclusive of the FRP sheet) to the sheet has been dependent solely on the chemical bonding force. Accordingly, like in the case of (2), peeling is likely to take place due to an external force such as earthquake or expansion or shrinkage of the structure over a long period of time, and the "blister" is likely to occur and spread.

(4) The sheet itself has low strength and low elastic modulus. Accordingly, if a compression force is exerted as a person steps on the structure, fatigue or deformation such as a dent on the sheet by creep is likely to occur, and cracking is likely to form in the FRP layer. As is evident from such a phenomenon, the strength is not adequate. Accordingly, it has been difficult to apply it to parking lot works or waterproofing works for so-called a heavy duty type where men step thereon or cars run thereon.

The present invention has been accomplished for the purpose of solving such difficulties of the prior art and providing a composite substrate for a waterproofing structure, which makes a simple waterproofing operation possible, a waterproofing method employing such a composite substrate, and a waterproofing structure having adequate strength, whereby interlaminar peeling scarcely occurs.

To accomplish the above object, the present invention provides a composite substrate for a waterproofing structure, which comprises a fiber mat and a closed cell foam sheet which are integrated by needling.

Likewise, to accomplish the above object, the present invention provides a waterproofing method which comprises mounting a composite substrate for a waterproofing structure comprising a fiber mat and a closed cell foam sheet which are integrated by needling, on a structure to which the waterproofing method is to be applied, and then applying a resin to the composite substrate for a waterproofing structure.

Further, the present invention provides a waterproofing structure comprising a structure to which a waterproofing method is to be applied, a composite substrate for a waterproofing structure, which comprises a fiber mat and a closed cell foam sheet which are integrated by needling, mounted on said structure, and a resin applied to the composite substrate for a waterproofing structure and cured, wherein the resin penetrates to the structure side via needled portions and cured to bond the structure and the composite substrate for a waterproofing structure.

Now, the present invention will be described in detail with reference to the preferred embodiments.

As described above, the composite substrate for a waterproofing structure of the present invention comprises a fiber mat and a closed cell foam sheet. This fiber mat may, for example, be a surfacing mat, a chopped strand mat, a continuous strand mat or a paper, wherein single fibers or strand fibers may be chemically bonded into a sheet by means of a resin powder or a resin emulsion, or they may be bound into a sheet by a mechanical method such as needling or machine-sewing.

Such a fiber mat preferably has a unit weight within a range of from 20 to 1,200 g/m². Further, preferred ranges of the unit weight depending upon the types of the fiber mats to be used, are as follows from the viewpoint of the economical efficiency (which correspond to the ranges which are commonly obtainable with commercial products).

Surfacing mat, paper: 20 to 100 g/m²

Chopped strand mat, continuous strand mat: 200 to 1,200 g/m²

Fibers constituting such a fiber mat may, for example, be inorganic fibers such as glass fibers, ceramic fibers or carbon fibers, or organic fibers such as polyester fibers.

On the other hand, as the closed cell foam sheet to be used together with the above fiber mat in the present invention, the one having a thickness of from 1 to 50 mm, preferably from 3 to 10 mm may be used. Such a closed cell foam sheet may be made, for example, of an acrylic resin, a vinyl chloride resin, polyethylene, polypropylene, polyurethane, a polyethylene/polystyrene copolymer, an acrylonitrile/butadiene/styrene copolymer (ABS) or rubber. Namely, any material may be used so long as it is a plastic capable of presenting a closed cell foam. However, since a resin will be used in its application, the plastic is required to have solvent resistance (the type of solvent resistance varies depending upon the resin to be used), and alkali resistance will further be required when the structure to which a waterproofing method is to be applied, is made of concrete.

The foaming magnitude of such a closed cell foam sheet may usually be within a range of from 5 to 50 times, preferably from 10 to 30 times. If this foaming magnitude is low, the weight reduction and the heat-insulating effect tend to be low. On the other hand, if the magnitude is too high, the foam is likely to act as a cushion material during formation of FRP, whereby the working efficiency tends to be poor.

Figure 1:
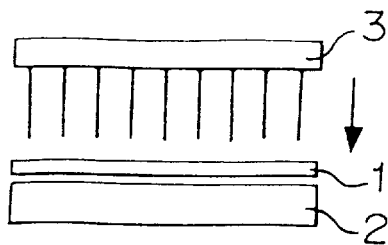
FIG. 1 is a schematic view illustrating a method for preparing the composite substrate for a waterproofing structure of the present invention.
Figure 2:
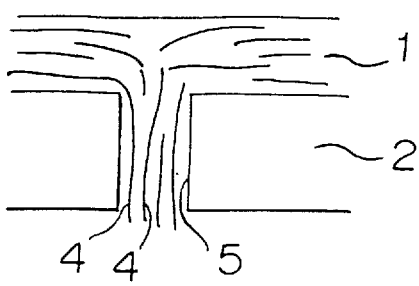
FIG. 2 is a side elevation of the composite substrate of a waterproofing structure of the present invention illustrating a state wherein fibers of the fiber mat pass through needled portions of a closed cell foam sheet.

The composite substrate for a waterproofing structure of the present invention is prepared in such a manner that, for example, as shown in FIG. 1, a fiber mat 1 and a closed cell foam sheet 2 are integrated by needling by means of a needling machine 3, so that for example, as shown in FIG. 2, at least part of fibers 4 of the fiber mat 1 passes through needled portions 5 in the closed cell foam sheet 2. Further, one or more fiber mats 1 and closed cell foam sheets 2 may respectively be used for needling. In a case where fiber mats of different types are used in combination, it is advisable to carry out needling by using a mat having a smooth surface like a surfacing mat as the outer layer, so that the FRP surface after application can be finished smoothly.

In the above needling, the number of needling strokes may, for example, be within a range of from 0.05 to 100 strokes per 1 cm², preferably from 1 to 100 strokes per 1 cm², more preferably from 3 to 25 strokes per 1 cm².

Further, in order to increase the bonding property, an adhesive may be disposed between the fiber mat 1 and the closed cell foam sheet 2, or the fiber mat 1 and the closed cell foam sheet 2 may be sewn by a suitable thread. In the latter case, the sewing thread may not necessarily be made of the same fiber as the fiber mat.

The composite substrate for a waterproofing structure of the present invention having such a construction, may be produced by preliminarily subjecting the fiber mat 1 and the closed cell foam sheet 2 to needling by a needling machine, or may be prepared, at an application site, by needling by means of a suitable roller having needling needles attached thereon. The diameter of needled portions (needling holes) in the composite substrate for a waterproofing structure of the present invention thereby obtained, can suitably be changed by adjusting the diameter of such needles. The diameter of needles is usually from 0.3 to 3 mm, preferably from 0.7 to 2.5 mm.

Figure 3:
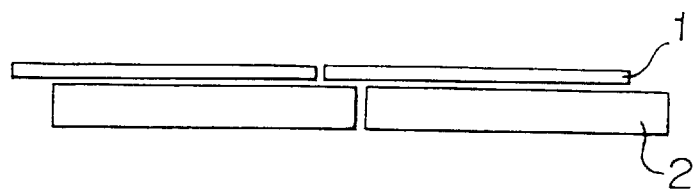
FIG. 3 is a side elevation illustrating an embodiment of a method for applying the composite substrate of a waterproofing structure of the present invention.
Figure 4:
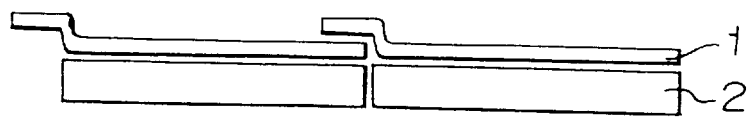
FIG. 4 is a side elevation illustrating another embodiment of a method for applying the composite substrate of a waterproofing structure of the present invention.

In any case, ends of the fiber mat 1 and the closed cell foam sheet 2 may not necessarily be flush with each other. It is rather preferred that the fiber mat 1 is displaced from the closed cell foam sheet 2 as shown in FIGS. 3 and 4 so that when a plurality of such substrates are disposed to abut against one another, the fiber mat 1 of one substrate covers the closed cell foam sheet 2 of the adjacent substrate (FIG. 3), or the fiber mat 1 of one substrate overlaps on the fiber mat of the adjacent substrate (FIG. 4), to facilitate the connection.

Figure 5:
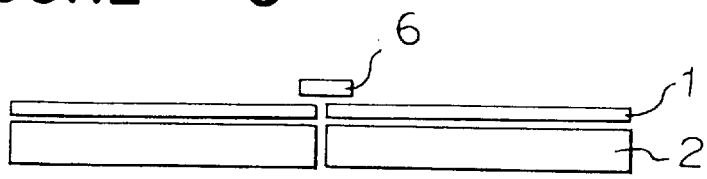
FIG. 5 is a side elevation illustrating still another embodiment of a method for applying the composite substrate of a waterproofing structure of the present invention.

As shown in FIG. 5, when ends of the fiber mat 1 and the closed cell foam sheet 2 are flush with each other, a reinforcing material 6 which may preferably be made of the same material as the fiber mat 1 may be provided to cover the abutting ends of the adjacent substrates.

As described above, the composite substrate for a waterproofing structure of the present invention is the one wherein a fiber mat and a closed cell foam sheet are integrated by mechanical bonding by needling. In a waterproofing method of the present invention using such a composite substrate, it is possible to accomplish integral formation of a closed cell foam sheet (a sheet according to a conventional method) and a plastic layer reinforced with the fiber mat (an FRP layer), and it is possible to provide a waterproofing structure of the present invention wherein a closed cell foam sheet and a structure are integrated.

Namely, the waterproofing method of the present invention comprises mounting the above-described composite substrate for a waterproofing structure on a structure to which the waterproofing method is to be applied, and then applying a resin to the composite substrate for a waterproofing structure. Especially at a R portion or a rising portion of a structure, a suitable amount of a resin may preliminarily be coated as an adhesive, so that the composite substrate for a waterproofing structure may be fixed thereto.

The resin to be used in the waterproofing method of the present invention is a commonly known liquid thermosetting resin. It may, for example, be preferably an unsaturated polyester resin, a vinyl ester resin, a methyl methacrylate resin, an epoxy resin or a furan resin. Among them, an unsaturated polyester resin is particularly preferred from the viewpoint of the impregnation property and the application efficiency.

When the resin is applied to the composite substrate for a waterproofing structure according to the method of the present invention, an FRP layer is formed on the surface, and at the same time, the resin penetrates to the structure via needled portions (i.e. holes) in the closed cell foam sheet to provide an effect of bonding the structure and the composite substrate for a waterproofing structure, whereby bonding of the structure and the sheet and formation of the FRP layer (bonding of the sheet and the FRP layer) will be simultaneously carried out. Thus, the operation can be simplified, and the operation efficiency will be improved.

Bedding of a concrete structure undergoes deterioration with time and usually has irregularities of from about 2 to 3 mm. Accordingly, when a waterproofing operation is to be carried out by a coating method, it is necessary to apply an irregularity-adjusting material such as a polymer dispersion mortar to make the irregular surface smooth, and it is required to wait until the irregularity-adjusting material shows a certain physical property (for example, in the winter time, aging for from 2 to 7 days will be required) before proceeding with the next step. Whereas, according to the above method of the present invention, fibers passing through the closed cell foam sheet form monofilaments at the rear side of the closed cell foam sheet, and the monofilament fibers are filled together with the impregnated resin in the irregularities to provide a strong adhesive strength, whereby it is unnecessary to apply an irregularity-adjusting material as required in the conventional method, and one step can be omitted.

The waterproofing structure of the present invention obtained by the above-described method, comprises a structure to which a waterproofing method is to be applied, the above-described composite substrate for a waterproofing structure, mounted on said structure, and a resin applied to said composite substrate for a waterproofing structure and cured, wherein the resin penetrates to the structure side via needled portions and cured, so that the cured resin constitutes a columnar structure, and the columnar structure constitutes a three dimensional structure of an I beam shape integrated with the FRP surface layer, whereby the structure is provided with a high level of resistance against pressure from above.

The resin penetrates to fibers of the fiber mat passing through the needled portions and then is cured to form a columnar structure by FRP, whereby in addition to the chemical bonding force by the resin, this columnar structure by FRP provides a strong anchoring effect to prevent peeling between the structure and the closed cell foam sheet and between the closed cell foam sheet and the FRP surface layer, whereby it is possible to prevent "blister" which used to be observed in the conventional waterproofing structure.

Further, in the waterproofing structure of the present invention, the structure and the closed cell foam sheet can be bonded with a small area in a spot bonding manner, whereby the follow-up property against expansion or shrinkage of the structure will be improved, and peeling therebetween can be thereby further prevented.

The number of needling strokes to obtain the three dimensional structure may be determined in relation with the external force. Namely, the follow-up property to the structure improves as the thickness of the closed cell foam sheet increases, but the impregnation efficiency thereby tends to be poor. On the other hand, the smaller the number of needling strokes, the better the follow-up property, but the compression thereby tends to be weak. Accordingly, the number of needling strokes may be determined taking into such a balance into consideration.

Now, the present invention will be described in further detail with reference to Examples. However, it should be understood that the present invention is by no means restricted by such specific Examples.

EXAMPLE 1
Preparation of a composite substrate for a waterproofing structure

A 30 times foamed sheet (Softron, tradename, manufactured by Sekisui Chemical Co., Ltd.) of a closed cell foam made of polyethylene and having a thickness of 5 mm and a glass chopped strand mat having a unit weight of 450 g/m$^2$ (manufactured by Asahi Fiber Glass Co., Ltd.) were integrated by needling to obtain a composite substrate for a waterproofing structure of the present invention. The number of needling strokes was 6.5 strokes/cm$^2$.

EXAMPLE 2 and COMPARATIVE EXAMPLE 1
Comparison of application efficiency

A comparative test for application efficiency was carried out by a process as identified in Table 1 between a waterproofing method by means of the composite substrate for a waterproofing structure of the present invention prepared in Example 1 (Example 2) and a coating type composite waterproofing method wherein only the glass chopped strand mat as used in Example 1, was employed without needling (Comparative Example 1) using a concrete base plate of about 10 m$^2$ (conditions: 18° C. under a relative humidity of 65%), whereby it was found that as shown in Table 1, in the waterproofing method of the present invention (Example 2), the required man×hour could be remarkably reduced, and the application operation was completed in one day, while in the coating type composite waterproofing method (Comparative Example 1), it took at least 2 days, and it was evident that there would be a problem if it rained during the period.

TABLE 1

| Process | Example 2 | | Comparative Example 1 | |
|---|---|---|---|---|
| | man × hour | Curing and drying time (hr) | man × hour | Curing and drying time (hr) |
| Primer treatment of concrete base material One pack urethane (Polyroof S-1, 0.2 kg/m$^2$) | 0.5 | 1.0 | 0.5 | 1.0 |
| Coating type (urethane) waterproofing material Polyroof PU-2, 2.0 kg/m$^2$ | — | — | 1.0 | 24 |
| Adhesive One pack urethane (Polyroof S-1, 0.2 kg/m$^2$) | — | — | 0.5 | 1.0 |
| FRP laminated layer (Polyroof S-2, 1.5 kg/m$^2$) | 1.0 | 1.0 | 1.0 | 1.0 |
| Polyester top coat | 0.5 | 1.0 | 0.5 | 1.0 |
| (Polyroof S-4, 0.5 kg/m$^2$) | | | | |
| Total | 2.0 | 3.0 | 3.5 | 28.0 |

EXAMPLE 3
Preparation of a resin-impregnated and cured product of a composite substrate for a waterproofing structure A performance evaluation test specimen according to Standard Specification of Building Works and Commentary Thereon JASS 8 Waterproofing Works (1993), was prepared as follows.

Primer treatment with one-pack urethane (Polyroof S-1, tradename, manufactured by Sowa Chemical Co., Ltd., 0.2 kg/m$^2$) was applied to a base plate (a concrete plate for pavement in accordance with JIS A5304). Then, the composite substrate for a waterproofing structure prepared in Example 1 was mounted thereon. An unsaturated polyester resin for waterproofing (Polyroof S-2, tradename, manufactured by Sowa Chemical Co., Ltd., 1.5 kg/m$^2$) was coated and impregnated thereon to obtain a cured product. With respect to the specimen thus obtained, a test for peeling between the base plate (the concrete plate) and the cured product (the composite substrate) was carried out.

COMPARATIVE EXAMPLE 2

Using the same polyethylene closed cell foam sheet and glass chopped strand mat as used in Example 1, the closed cell foam sheet was bonded to the base plate by means of an adhesive (chloroprene type, 0.5 kg/m$^2$), then the glass chopped strand mat was mounted thereon and then the unsaturated polyester resin for waterproofing was coated and impregnated in the same manner as in Example 3, to obtain a cured product.

With respect to a compression test, however, in each of Example 3 and Comparative Example 2, a release agent was preliminarily coated on a glass plate, then the substrate was mounted thereon, and the resin was coated and impregnated in the same manner as described above to obtain a cured product.

Comparative test for performance

Comparison in performance was carried out with respect to the resin-impregnated cured products of Example 3 and Comparative Example 2, whereby as shown in Table 2, it was found that the cured product obtained by using the composite substrate for a waterproofing structure of the present invention was highly resistant against peeling and compression, and a three dimensional structure of an I beam shape was formed.

TABLE 2

| Test items | Example 3 | Comparative Example 2 |
|---|---|---|
| Peeling test (kg/25 mm) | | |
| 1. Room temperature (23° C.) | 7.0 | 1.2 |
| 2. After being left under a wet heat condition (60° C. under a relative humidity of 95% for 1 month) | 6.0 | 0.2 |
| Compression strength (kg/cm$^2$) (at the time of 25% displacement) | 25.0 | 0.5 |

The peeling test in the above Table 2, was carried out by a method for testing a peel bond strength of a common adhesive in accordance with JIS A6040, and the compression test was carried out by a common test method for a thermosetting plastic in accordance with JIS K6911.

EXAMPLE 4

Using the same composite substrate for a waterproofing structure of the present invention as used in Example 1, a test specimen was prepared as described below by the same method as in Example 3.

COMPARATIVE EXAMPLE 3

Without using the closed cell foam sheet, the unsaturated polyester resin for waterproofing (Polyroof S-2, tradename, manufactured by Sowa Chemical Co., Ltd., 1.5 kg/m$^2$) was coated and impregnated to a glass chopped strand mat having a unit weight of 450 g/m$^2$ (manufactured by Asahi Fiber Glass Co., Ltd.) and cured to obtain FRP, and using this FRP, a test specimen was prepared as follows.

Tests on various properties required for a waterproofing structure

With respect to the test specimens of Example 4 and Comparative Example 3, an impact resistance test and a fatigue test were carried out in accordance with JASS 8. As the test specimen for the fatigue test, A-type (400 mm in length×150 mm in width×8 mm in thickness (V-groove: 6 mm), the specimen area: 300×50 mm) was used. A crack follow-up property test was carried out by using the test specimen for the fatigue test, wherein the elongation until peeling occurred, was measured. The results are shown in the following Table 3.

TABLE 3

| Test items | Example 4 | Comparative Example 3 |
|---|---|---|
| Impact resistance test (height: 1.0 in) | | |
| 0° C. | Indentation formed, but no hole formed. | Broke. |
| 23° C. | Indentation formed, but no hole formed. | A hole formed. |
| 60° C. | Indentation formed, but no hole formed. | A hole formed. |
| Crack follow-up property test (Elongation mm till peeling) | | |
| 0° C. | 23 | 2.1 |
| 23° C. | 21 | 2.5 |
| 60° C. | 24 | 2.3 |
| Fatigue test | Fatigue A4 None of three specimens broke in step 3. | Fatigue A1 A11 of three specimens broke in step 1. |

As shown in the above Table 3, the waterproofing structure wherein the composite substrate for a waterproofing structure of the present invention is used, has high strength and durability as compared with a single FRP plate.

EXAMPLE 5

A composite substrate for a waterproofing structure of the present invention was prepared in the same manner as in Example 1 except that the closed cell foam sheet of polyethylene was the one having a thickness of 20 mm, and using this composite substrate, a test specimen was prepared in the same manner as in Example 3.

COMPARATIVE EXAMPLE 4

A test specimen was prepared in the same manner as in Comparative Example 2 except that instead of the closed cell foam sheet of polyethylene having a thickness of 5 mm, a closed cell foam sheet of polyurethane having a thickness of 20 mm was used, and the amount of the adhesive was changed to 0.3 kg/m$^2$.

COMPARATIVE EXAMPLE 5

A test specimen was prepared in the same manner as in Example 3 using 20 layers of a glass chopped strand mat having a unit weight of 450 g/m$^2$ and an unsaturated polyester resin (21 kg/m$^2$) without using a closed cell foam sheet.

However, in each of Example 5 and Comparative Examples 4 and 5, with respect to the compression test and the heat resistance test, test specimens were prepared in such a manner that a release agent was preliminarily coated on a glass plate, then the substrate was placed thereon and the resin was coated and impregnated in the same manner as described above.

Comparison of performance of waterproofing structures by an external heat insulating method The compression test was carried out by a common test method for a thermosetting plastic in accordance with JIS K6911, and the heat resistance was calculated from the thickness and the measured value of the thermal conductivity in accordance with JIS A1412. Further, the heating and cooling cycle test was carried out up to 300 cycles, wherein each cycle consisted of 4 hours at 60° C. under a relative humidity of 95% and 4 hours at −20° C.

As a result, it was found that as shown in the following Table 4, the waterproofing structure of the present invention has high strength, high heat resistance and excellent durability as compared with the structure wherein a polyurethane foam is used, also when used for an external heat insulating method.

TABLE 4

| Test items | Example 5 | Comparative Example 4 | Comparative Example 5 |
|---|---|---|---|
| Compression strength (kg/cm²) (at the time of 25% displacement) | 20.0 | 0.5 | — |
| Heating and cooling cycle test | At least 300 cycles | Peeling observed upon 40 cycles | — |
| Heat resistance (m² h °C./kcal) | 0.577 | 0.561 | 0.100 |

As described in the foregoing, the composite substrate for a waterproofing structure of the present invention comprising a fiber mat and a closed cell foam sheet which are integrated by needling, solves the problems of the prior art and makes a simple waterproofing method of the present invention possible, and a waterproofing structure using such a composite substrate for a waterproofing structure, is excellent, since it has adequate strength and scarcely undergoes interlaminar peeling.

What is claimed is:

1. A waterproofing structure comprising a structure to which a waterproofing method is to be applied, and a resin-impregnated composite substrate for a waterproofing structure, which comprises a fiber mat and a closed cell foam sheet which are integrated by needling, mounted on said structure, wherein the resin penetrates into the fiber mat and the needled portions of the composite substrate, and when cured, bonds the structure and the composite substrate.

2. The waterproofing structure according to claim 1, wherein the fiber mat is a surfacing mat, a chopped strand mat, a continuous strand mat or a paper.

3. The waterproofing structure according to claim 1, wherein the fiber mat has a unit weight of from 20 to 1,200 g/m².

4. The waterproofing structure according to claim 1, wherein the fibers of the fiber mat are inorganic fibers or organic fibers.

5. The waterproofing structure according to claim 1, wherein the closed cell foam sheet is made of an acrylic resin, a vinyl chloride resin, polyethylene, polypropylene, polyurethane, a polyethylene/polystyrene copolymer, an acrylonitrile/butadiene/styrene copolymer, or rubber.

6. The waterproofing structure according to claim 1, wherein at least part of the fibers of the fiber mat passes through needled portions in the closed cell foam sheet.

7. The waterproofing structure according to claim 1, wherein the number of needling strokes is from 0.05 to 100 strokes per 1 cm².

8. The waterproofing structure according to claim 1, wherein an adhesive is disposed between the fiber mat and the closed cell foam sheet.

9. The waterproofing structure according to claim 1, wherein the fiber mat and the closed cell foam sheet are sewn by a thread.

10. A waterproofing method which comprises mounting a water-impermeable composite substrate for a waterproofing structure comprising a fiber mat and a closed cell foam sheet which are integrated by needling, on a structure to which the waterproofing method is to be applied, and then applying a resin to the composite substrate for a waterproofing structure.

11. The waterproofing method according to claim 10, wherein the resin penetrates to the structure side via the needled portions.

12. The waterproofing method according to claim 10, wherein the resin penetrates to the structure side via the fibers of the fiber mat passing through the needled portions.

13. A waterproofing structure comprising a structure to which a waterproofing method is to be applied, a water-impermeable composite substrate for a waterproofing structure, which comprises a fiber mat and a closed cell foam sheet which are integrated by needling, mounted on said structure, and a resin applied to the composite substrate for a waterproofing structure and cured, wherein the resin penetrates to the structure side via needled portions and cured to bond the structure and the composite substrate for a waterproofing structure.

14. The waterproofing structure according to claim 13, wherein the resin penetrates to the structure side together with fibers of the fiber mat and cured to bond the structure and the composite substrate for a waterproofing structure.

15. The waterproofing structure according to claim 13, wherein the cured resin is present between the composite substrate for a waterproofing structure and the structure.

16. The composite substrate for a waterproofing structure according to claim 1, wherein the fiber mat is displaced from the closed cell foam sheet so that when a plurality of such substrates are disposed to abut against one another, the fiber mat of one substrate covers the closed cell foam sheet of the adjacent substrate.

17. The composite substrate for a waterproofing structure according to claim 1, wherein the fiber mat is displaced from the closed cell foam sheet so that when a plurality of such substrates are disposed to abut against one another, the fiber mat of one substrate overlaps on the fiber mat of the adjacent substrate.

18. The composite substrate for a waterproofing structure according to claim 1, wherein the fiber mat is flush with the closed cell foam sheet so that when a plurality of such substrates are disposed to abut against one another, a reinforcing material is provided to cover the abutting ends of the substrates.

19. The composite substrate for a waterproofing structure according to claim 4, wherein the fibers of the fiber mat are inorganic fibers selected from the group consisting of glass fibers, ceramic fibers and carbon fibers.

20. The composite substrate for a waterproofing structure according to claim 4, wherein the fibers of the fiber mat are polyester fibers.

* * * * *